(12) United States Patent
Neff et al.

(10) Patent No.: US 8,307,530 B1
(45) Date of Patent: Nov. 13, 2012

(54) GEOTHERMAL DRILLING DEVICE AND METHOD

(75) Inventors: Kevin E. Neff, Ravenna, OH (US); Robert G. Silvers, Mogadore, OH (US)

(73) Assignee: Geothermal Professionals ltd, South Russell, OH (US)

( * ) Notice: Subject to any disclaimer, the term of this patent is extended or adjusted under 35 U.S.C. 154(b) by 334 days.

(21) Appl. No.: 12/814,462

(22) Filed: Jun. 13, 2010

(51) Int. Cl.
*F21B 33/13* (2006.01)
*F28D 20/00* (2006.01)
*E21B 33/13* (2006.01)

(52) U.S. Cl. .............. 29/428; 166/290; 166/45; 166/57; 166/302; 166/286; 290/2

(58) Field of Classification Search ............ 29/428; 166/45, 57, 286, 290, 302; 290/2
See application file for complete search history.

(56) References Cited

U.S. PATENT DOCUMENTS

| 4,041,718 | A | * | 8/1977 | Stone | 405/227 |
| 4,286,651 | A | * | 9/1981 | Steiger et al. | 165/45 |
| 5,634,515 | A | * | 6/1997 | Lambert | 165/45 |
| 5,758,724 | A | * | 6/1998 | Amerman | 166/290 |
| 6,112,833 | A | * | 9/2000 | Lambert | 175/62 |
| 6,257,803 | B1 | * | 7/2001 | McCabe et al. | 405/269 |
| 7,281,576 | B2 | * | 10/2007 | Curtice et al. | 166/250.14 |
| 7,331,180 | B2 | * | 2/2008 | Marnoch | 60/645 |

* cited by examiner

*Primary Examiner* — Derris Banks
*Assistant Examiner* — Anthony Green
(74) *Attorney, Agent, or Firm* — Forrest L. Collins Law Offices, LLC; Forrest L. Collins

(57) ABSTRACT

A system for introducing a geothermal system having a geothermal line and a releasable grout line into a bore in the earth is described. The grout line is withdrawn at a point where it is desired to introduce grout into the bore in the earth.

11 Claims, 4 Drawing Sheets

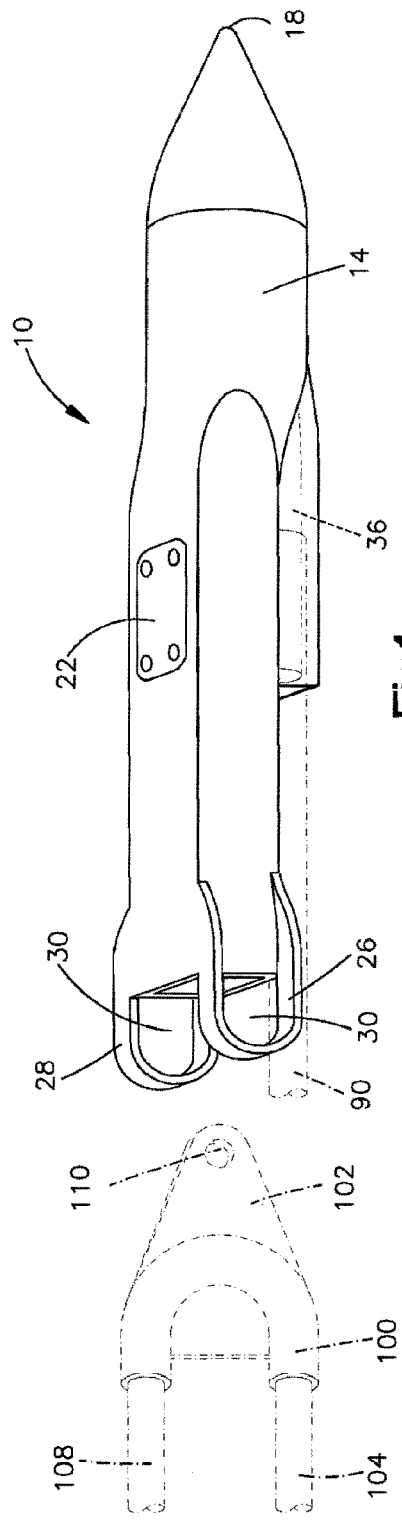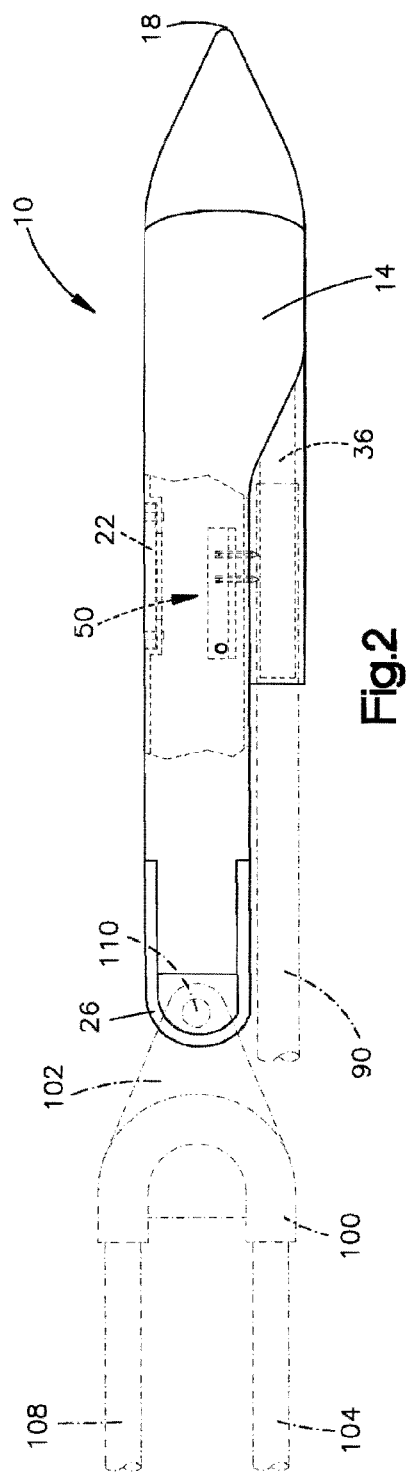

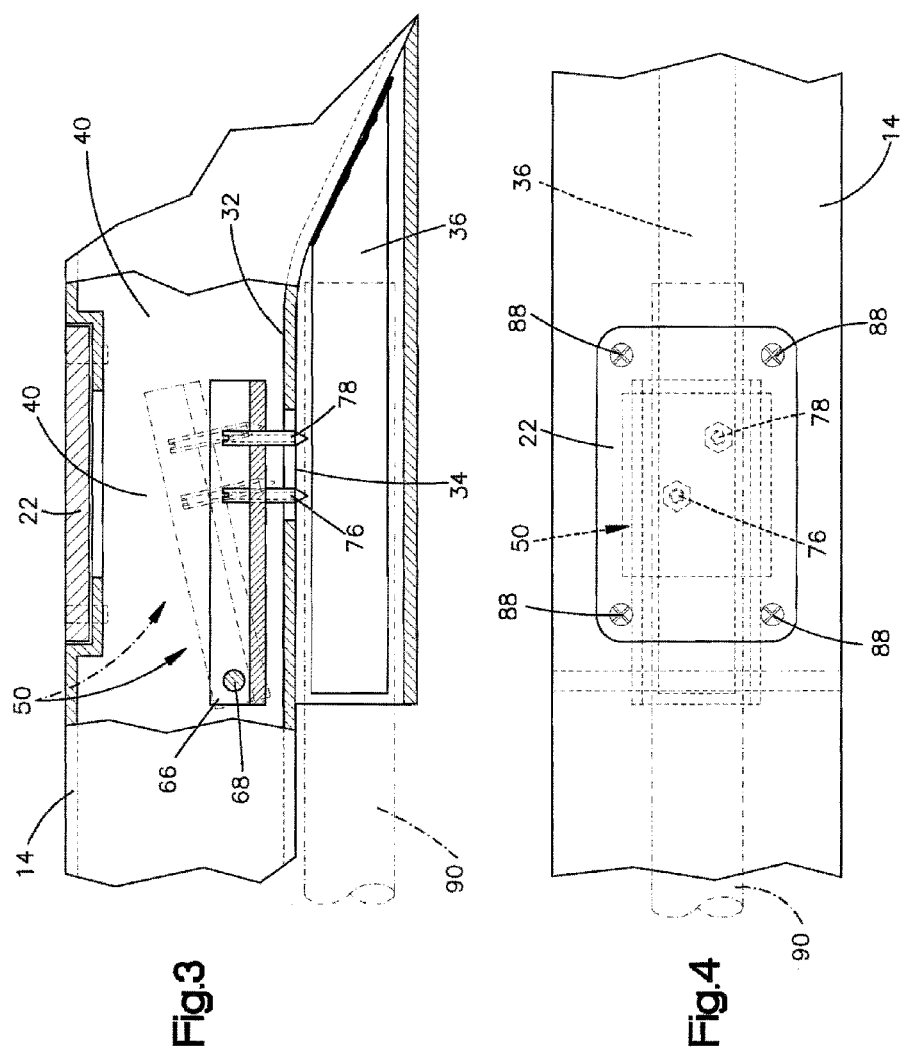

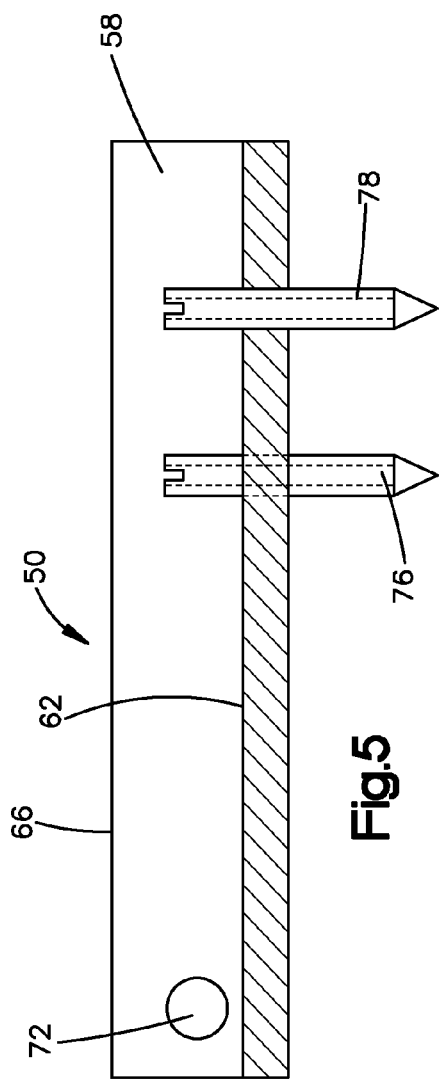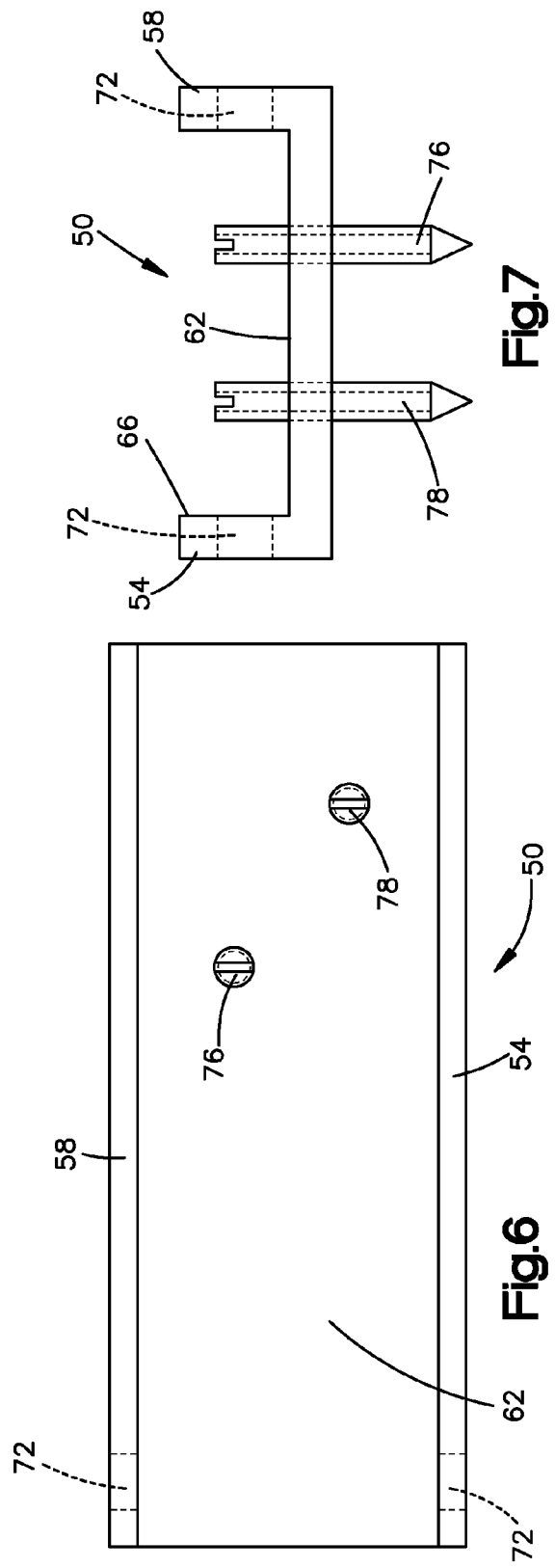

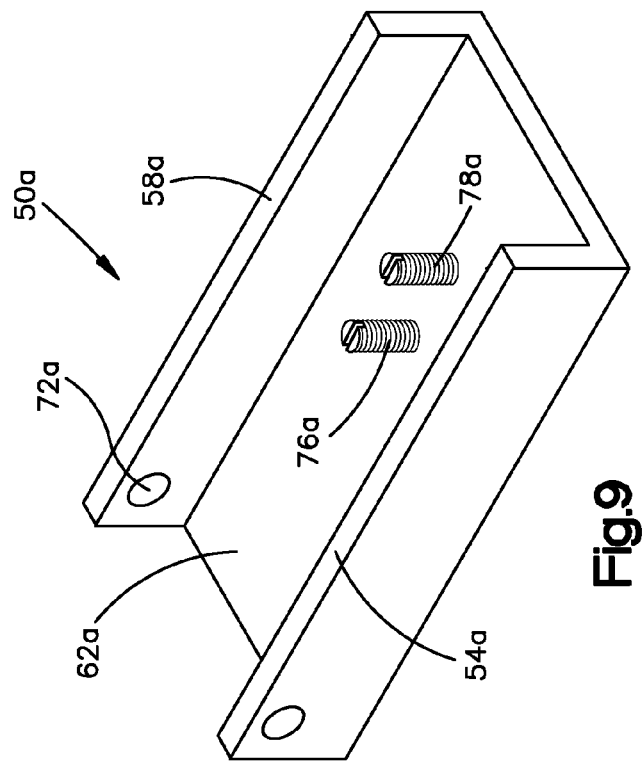
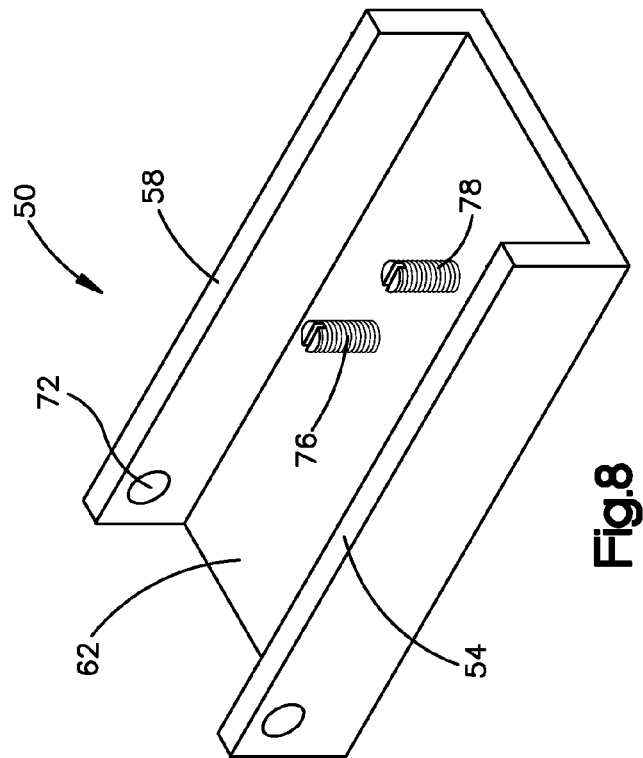

GEOTHERMAL DRILLING DEVICE AND METHOD

BACKGROUND OF THE INVENTION

1. Field of the Invention

The present invention aids in underground heat exchange systems, apparatus and methods for installing a pipe in the earth.

2. Description of the Art Practices

The art discloses a variety of systems for installing ground heat exchange pipe loops in a bore hole. Two conduits are inserted into the bore hole. The first conduit is a heat extraction loop employed to extract heat from the earth for use in a heating and cooling system. The second conduit is a grout line.

When the bore hole is drilled into the earth portions of the soil into which the bore hole is drilled will leave air filed voids or will be so loosely compacted that a large region in the bore hole will be a void with air entrained therein. To ensure that the air which is an effective insulator does not disrupt the extraction of energy from the heat extraction loop a grout line is placed in the ground with the heat extraction loop.

The heat extraction loop will be placed as far in the bore hole as practically possible to obtain the maximum possible energy extraction. The heat extraction loop will remain in bore hole at the maximum distance possible. The grout line will also accompany heat extraction loop into the bore hole at or near the in ground terminus of the bore hole. However, the grout line will be slowly removed from the bore hole as the grout is introduced through the grout line. The grout will then fill the voids surrounding the borehole and aids in compacting the air filled soil to reduce the insulating effect previously described.

U.S. Pat. No. 4,516,629 issued May 14, 1985 describes a heat exchanger unit constructed as to permit rapid installation in and removal from the earth at small size sites of desired use of the heat pump system. The unit includes a freon-conducting coil assembly preferably comprised of a plurality of concentric coils defining parallel flow paths for the fluid conducted to and from the heat exchanger unit during operation of the system. In one embodiment the coils are preferably formed of tubing of differing diameters, and the convolutions of each coil are preferably spaced from one another and from the other coils of the assembly. The coil assembly may be enclosed by an impervious cylindrical casing to and from which anti-freeze liquid may be readily conducted while the heat exchanger unit is situated entirely below ground level. Water supply means may be provided in association with the heat exchanger unit to maintain the soil adjacent thereto in a moist condition. In another embodiment there is no outer casing and water flows through an inner coil and exits along one side of the exchanger to provide a cooling effect on the outer freon carrying coil. Couplings of a fluid retentive and quickly connectable and disconnectable type releasably connect the heat exchanger unit to aboveground components of the heat pump system and one or more heat exchangers may be coupled to provide additional capacity as required.

U.S. Pat. No. 5,477,703 issued Dec. 26, 1995 to Hanchar, et al., relates to an apparatus comprising a geothermal cell and recovery system comprising a heat exchange zone located in the earth and separated from the earth by an impermeable barrier. A housing containing a fluid pump and compressor is submersed in heat exchange zone and a fluid conduit return assembly is positioned in the bottom section of the heat exchange zone. A fluid discharge assembly receives fluid from the pump and is positioned in the top section of the heat exchange zone. An underground heat pipe extends through the heat exchange zone. Back-fill material is positioned around the underground heat pipe and the housing heat pump is connected to the underground heat pipe.

U.S. Pat. No. 5,590,715 to Amerman issued Jan. 7, 1997 discloses a system and method for simultaneously installing a pipe loop and a grout pipe in a wellbore. In another aspect such a system is then used to grout the wellbore by releasing the grout pipe from the pipe loop or from a bottom member connected with the pipe loop and then introducing grout through the pipe into the wellbore as the grout pipe is removed upwardly from the wellbore. In another aspect a drilling-grouting system is provided with which while one hole is being drilled a previously-drilled hole is being grouted.

U.S. Pat. No. 5,758,724 to Amerman issued Jun. 2, 1998 is a division of U.S. application Ser. No. 08/527,114 filed Sep. 12, 1995 entitled "Underground Heat Exchange System" issued Jan. 7, 1997 as U.S. Pat. No. 5,590,715. U.S. Pat. No. 6,041,862 to Amerman issued Mar. 28, 2000 is a continuation-in-part of U.S. application Ser. No. 08/779,812 filed Jan. 6, 1997 entitled "Underground Heat Exchange System", now U.S. Pat. No. 5,758,724 which is a division of U.S. application Ser. No. 08/527,114 filed Sep. 12, 1995 entitled "Underground Heat Exchange System" issued Jan. 7, 1997 as U.S. Pat. No. 5,590,715. U.S. Pat. No. 6,672,371 to Amerman, et al., issued Jan. 6, 2004 is a continuation-in-part of U.S. application Ser. No. 09/087,705 filed Jun. 1, 1998 now U.S. Pat. No. 6,041,862 which is a continuation-in-part of U.S. application Ser. No. 08/779,812 filed Jan. 6, 1997 entitled "Underground Heat Exchange System" issued as U.S. Pat. No. 5,758,724 on Jun. 2, 1998 which is a division of U.S. application Ser. No. 08/527,114 filed Sep. 12, 1995 entitled "Underground Heat Exchange System" issued Jan. 7, 1997 as U.S. Pat. No. 5,590,715.

In U.S. Pat. No. 5,634,515 issued Jun. 3, 1997 to Lambert a geothermal heat transfer system comprises a plurality of heat exchange loops placed in the ground at an angle of less than a 20 degrees, but greater than a 5 degrees. Each loop has an out flow line and a return line, and a fluid tight, tapered and, U-turn juncture connecting the lines. A pair of distributors connects to inlet and outlet lines at a lower end and a plurality of outlet members at the upper end. A heat exchange device connects to the loops through the inlet and outlet lines. A liquid-oil-gas separator uses cup member and deflector to create a Venturi fluid inlet to separate the oil, returning it to the compressor. A bore hole drilling device comprises an hollow drilling bit with a cutting member at one end, a central fluid passage, and connecting means. The bore hole drilling device has a swivel member with a body portion and housing with a central bore and an inlet, connect to a water line. The body is position within the central bore and mounted for rotational motion within the housing. Lambert, U.S. Pat. No. 6,112,833 Sep. 5, 2000 is a divisional of Ser. No. 08/580,469 filed on Dec. 28, 1995 now U.S. Pat. No. 5,634,515.

U.S. Pat. No. 6,688,129 listing Ace as an inventor was filed Feb. 10, 2004. The Ace patent discloses a coaxial-flow heat exchanging structure having a proximal end and a distal end for exchanging heat between a source of fluid at a first temperature and the environment (e.g. air, ground, water, slurry etc.) at a second temperature. The coaxial-flow heat transfer structure comprises: a thermally conductive outer tube section, and an inner tube section having an inner flow channel and being coaxially arranged within the outer tube section. An outer flow channel is formed between the inner and outer tube sections, and helically-extending turbulence generator is provided along the outer flow channel, so as to create turbulence along the flow of heat exchanging fluid flowing between the inner and outer flow channels, and thereby increasing the heat transfer through the walls of the outer tube section to the ambient environment.

U.S. Pat. No. 7,195,176 Newman Mar. 27, 2007 provides a temperate water supply system includes a temperate water storage tank and a heat exchanger. The temperate water storage tank has a first tank inlet, a first tank outlet, a second tank inlet and a second tank outlet. The first tank inlet is connectable to a cold water source. The first tank outlet is connectable to at least one temperate water use point in the residence. The heat exchanger has a heat exchanger inlet and a heat exchanger outlet and a plurality of water conduits connected in parallel fluid communication with the heat exchanger inlet and with the heat exchanger outlet. The heat exchanger inlet is connectable to the second tank outlet, and the heat exchanger outlet is connectable to the second tank inlet. In use, the plurality of water conduits are filled with water and are in contact with ambient air in the residence that is warmer than the water at least a portion of the time, so that heat is transferred from the ambient air to the water.

Marnoch in U.S. Pat. No. 7,331,180 issued Feb. 19, 2008 recites an apparatus and method for converting a differential in thermal energy between a first thermal source having a thermal conducting fluid and a second thermal source having a thermal conducting fluid is provided. The apparatus employs a first vessel and a second vessel. Each of the vessels contain a gas under pressure the vessels contain heat exchanging coils that are connected to the thermal sources by fluid lines. A plurality of cooperating valves regulate the flow of the thermal conducting fluid from the first and second thermal sources to the first and second vessels. The valves alternate between first and second operating positions. In the first position, the valves permit a flow of thermal conducting fluid from the first thermal source to the first vessel and from the second thermal source to the second vessel and prevent a flow of thermal conducting fluid from the first thermal source to the second vessel and from the second thermal source to the first vessel. In the second position, the valves permit a flow of thermal conducting fluid from the first thermal source to the second vessel and from the second thermal source to the first vessel and prevent a flow of thermal energy from the first thermal source to the first vessel and from the second thermal source to the second vessel. A pressure driven actuator in fluid communication with the first and second vessels is driven into reciprocating motion between a first position and a second position by alternating positive pressure and negative pressure from the first and second vessels.

U.S. Pat. No. 7,370,488 Kidwell, et al., issued May 13, 2008 discloses a geothermal heat exchanging system including a heat exchanging subsystem installed above the surface of Earth, and one or more coaxial-flow heat exchanging structures installed in the Earth. The coaxial-flow heat exchanging structures installed in the Earth, facilitate the transfer of heat energy in the aqueous-based heat transfer fluid, between the aqueous-based heat transfer fluid and material beneath the surface of the Earth. Each coaxial-flow heat exchanging structure includes an inner tube section, a thermally conductive outer tube section, and outer flow channel between the inner tube section and the outer tube section. A turbulence generating structure is disposed along a portion of the length of the outer flow channel so as to introduce turbulence into the flow of the aqueous-based heat transfer fluid flowing along the outer flow channel, thereby improving the transfer of heat energy between the aqueous-based heat transfer fluid and the Earth along the length of the outer flow channel.

U.S. Pat. No. 7,373,785 Kidwell, et al., issued May 20, 2008 is a continuation of U.S. application Ser. No. 11/372, 224 filed Mar. 9, 2006; which is a continuation-in-part of U.S. application Ser. No. 11/076,428 filed Mar. 9, 2005. U.S. Pat. No. 7,377,122 Kidwell, et al., issued May 27, 2008 is a continuation of U.S. application Ser. No. 11/372,224 filed Mar. 9, 2006; which is a continuation-in-part of U.S. application Ser. No. 11/076,428 filed Mar. 9, 2005 now U.S. Pat. No. 7,347,059. United States Patent Application 20090250200 Kidwell, et al., is application is a continuation of U.S. application Ser. No. 11/413,975 filed Apr. 28, 2006; which is a continuation-in-part of U.S. application Ser. No. 11/372,224 filed Mar. 9, 2006, now U.S. Pat. No. 7,363,769 B2; which is a continuation-in-part of U.S. application Ser. No. 11/076,428 filed Mar. 9, 2005, now U.S. Pat. No. 7,347, 059 B2 Ser. No. 11/372,224 filed Mar. 9, 2006, now U.S. Pat. No. 7,363,769 B2; which is a continuation-in-part of U.S. application Ser. No. 11/076,428 filed Mar. 9, 2005, now U.S. Pat. No. 7,347,059.

U.S. Pat. No. 7,566,980 issued to Fein, et al., Jul. 28, 2009 recites a roadway system and method for energy generation and distribution are presented. This system allows a geothermal infrastructure to be tied into the roadway system electricity grid. The geothermal infrastructure may include energy exchangers that are electrically connected to the roadway system electricity grid. By connecting the energy exchangers electrically to the roadway system electricity grid, the energy exchangers may be powered by solar and/or wind generating devices. In one embodiment of the invention, a roadway system for energy generation and distribution comprises a plurality of energy harnessing devices (e.g., solar and/or wind generating devices). The roadway system electricity grid is configured for mass distribution of electricity. The energy exchangers are configured to electrically connect to the roadway system electricity grid. Each of substantially all of the energy harnessing devices, is electrically connected to the roadway system electricity grid and positioned on part of one of the roads.

United States Patent Application 20050252226 naming Seefeldt as an inventor published Nov. 17, 2005 and discloses a heat pump system including a first heating/cooling exchange loop including a refrigerant to water heat exchanger to produce a first output. A second heating/cooling exchange loop includes a refrigerant to forced air heat exchanger to produce a second output. A compressor is fluidly coupled to the first heating/cooling exchange loop and the second heating/cooling exchange loop. A controller is connected to control the first output and the second output and to transmit control signals to the at least one compressor, for balancing the first output and the second output responsive to a structural heating/cooling load.

To the extent that the foregoing references are relevant to the present invention, they are herein specifically incorporated by reference. Certain portions of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

SUMMARY OF THE INVENTION

The present invention discloses a system for simultaneously installing a heat exchange fluid pipe loop and a grouting pipe in a wellbore. The system, in one embodiment, has a bottom member to which both conduits are attached and to which the grouting pipe is releasably attached. The bottom member may be of sufficient mass itself or it may have weights connected thereto so it will easily move down the wellbore. In another embodiment an integral loop of pipe is used with an inlet pipe secured to one side of the loop and an outlet pipe secured to the other side of the loop.

In one aspect the bottom member has an inlet connection and an outlet connection to which are secured inlet and outlet pipe of the pipe loop. A passageway through the bottom member provides for fluid communication between the inlet and outlet pipes so that heat exchange fluid may flow down the inlet pipe, through the passageway in the bottom member, and up through the outlet pipe.

In one aspect such a bottom member has an attachment mechanism in which the grouting pipe is held. Pulling on the grouting pipe releases it from the bottom member for removal from the wellbore as grout flows out from the bottom of the grouting pipe.

In certain embodiments the grouting pipe is made of commercially available coiled tubing, e.g. in one aspect with an inside diameter of about one and three-tenths inches and an outside diameter of about one and a half inches; and the pipe loop is, e.g., three quarters of an inch in inside diameter made of high density polyethylene. In certain embodiments a wellbore for such heat exchange systems is three to three-and-a-half inches in diameter. In one aspect the bottom member is made of plastic and is pointed to facilitate its downward movement in the wellbore.

In one system and method according to the present invention a coiled tubing unit (CTU) is used to drill heat loop bore holes. The CTU has a reel on which is wrapped continuous flexible steel tubing, an injector which transports the tubing into and out of the hole, a drill bit on the end of a down hole motor, and a pump which supplies fluid for drilling. The motor is rotated by the pump pressure from the surface, which allows the unit to drill without rotating the drill string. This feature results in several benefits not possible with conventional drilling rigs.

Directional drilling allows multiple wells to be drilled from one location. It also reduces the space required between bore holes and allows them to be drilled in a very close proximity to the subject building. This process not only reduces the trenching on some jobs, but allows the unit to drill under existing slabs, driveways, parking lots and buildings. The compact design and directional drilling capabilities opens the retrofit market to geothermal systems.

With a method according to the present invention a relatively short surface trench is excavated before drilling is started. The drilling machine straddles the trench, drilling bore holes in the bottom of the trench as it moves over the length of the trench. A solids control system which cleans the drilling fluid as it is pumped from the hole, allowing cuttings to be dry discharged in a designated area, thereby maintaining a clean, dry drill site.

As each hole is drilled, a track mounted rig moves approximately two to three feet down the trench to the next drilling location. A grout reel is then positioned over the previously drilled hole. This reel has a flexible grout pipe wrapped around a powered reel. As the grout pipe is pushed down the bore hole, it takes a plastic heat loop with it to the bottom of the hole.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a perspective of an aspect of the invention;
FIG. 2 is a perspective of an aspect of the invention;
FIG. 3 is a partial cut away view of an aspect of the invention;
FIG. 4 is a top view according to FIG. 3;
FIG. 5 is a view of an aspect of the invention;
FIG. 6 is a top view according to FIG. 5;
FIG. 7 is a top view according to FIG. 5;
FIG. 8 is a perspective of an aspect of the invention; and
FIG. 9 is a perspective of an alternative aspect of the invention according to FIG. 8.

With more particular reference to the drawings the following is set forth.

DETAILED DESCRIPTION OF THE INVENTION

As best seen in FIG. 1, is a bullet shaped body member 10. The bullet shaped body member 10 is constructed of a steel alloy. The bullet shaped body member 10 may be obtained in two hemispheric segments and joined together.

The bullet shaped body member 10 has a bullet shaped body member wall 14. The bullet shaped body member 10 has a bullet shaped body member nose piece 18 to aid in insertion into a bore in the earth. A removable or operatively openable 22 fits over a portion of the bullet shaped body member nose piece 18.

A fluid line retention mechanism 26 extends from an end of the bullet shaped body member 10 opposite the bullet shaped body member nose piece 18. A fluid line retention mechanism 28 extends from an end of the bullet shaped body member 10 opposite the bullet shaped body member nose piece 18. The fluid line retention mechanism 26 and the fluid line retention mechanism 28 each define a fluid line retention mechanism opening 30.

Per FIG. 3 a bullet shaped body member inner wall 32 is located in the bullet shaped body member 10. A bullet shaped body member inner wall opening 34 is located in the bullet shaped body member inner wall 32. A projecting rod 36 extends within the bullet shaped body member 10 from the region of bullet shaped body member nose piece 18. The projecting rod 36 extends along a portion of the bullet shaped body member inner wall 32.

The bullet shaped body member inner wall 32 and the bullet shaped body member wall 14 partially define a bullet shaped body member chamber 40. The upper and lower areas of the bullet shaped body member chamber 40 communicate via the bullet shaped body member inner wall opening 34.

As best seen in FIG. 3, a pivoting mechanism assembly 50 is located within the upper area of the bullet shaped body member chamber 40. The pivoting mechanism assembly 50 is attached to the bullet shaped body member wall 14 at opposite sides of the bullet shaped body member 10. The pivoting mechanism assembly 50 is at least partially rotatable at one end and is fixed at the other end.

More particularly described in FIG. 5, the pivoting mechanism assembly 50 is conveniently a U-shaped metal piece. The pivoting mechanism assembly 50 has a pivoting mechanism side wall 54 and a pivoting mechanism side wall 58. A pivoting mechanism floor 62 is located between the pivoting mechanism side wall 54 and the pivoting mechanism side wall 58.

A pivoting mechanism rotation region 66 defines the pivoting point of the pivoting mechanism assembly 50. A pivoting mechanism rotation pin 68 is passes through a pivoting mechanism side wall opening 72 and then through the bullet shaped body member wall 14. The pivoting mechanism rotation pin 68 may be of any convenient construction as long as it has sufficient strength not to deform during the later described operation of introducing the bullet shaped body member 10 into a bore in the earth.

The pivoting mechanism assembly 50 has one or more openings drilled through the pivoting mechanism floor 62. The openings in the pivoting mechanism floor 62 receive a pivoting mechanism set screw 76. If more than one opening is drilled through the pivoting mechanism floor 62 a further pivoting mechanism set screw 78 may be placed into the openings.

An alternative version of the placement of the openings drilled through the pivoting mechanism floor 62 is shown in FIG. 6 and FIG. 9 with the insertion of pivoting mechanism set screw 76*a* and 78*a*.

The pivoting mechanism set screw 76 and the pivoting mechanism set screw 78 are conveniently threaded with a slot in the top oriented toward the upper region of the bullet shaped body member chamber 40. The pivoting mechanism set screw 76 and the pivoting mechanism set screw 78 are adjustable as later described to facilitate the retention of a grout line within the bullet shaped body member 10.

The cover plate 22 as previously described is located in the top of the bullet shaped body member 10. The cover plate 22 is held in place by one or more cover plate screws 88.

In operation the bullet shaped body member 10 is received from a factory. The cover plate 22 is secured in place by the cover plate screws 88. The cover plate screws 88 are removed and a grout line 90 is inserted into the lower region of the bullet shaped body member chamber 40. The 90 is aligned over the projecting rod 36. It is not necessary that the grout line 90 snuggly fit over the projecting rod 36.

The pivoting mechanism set screw 76 and the pivoting mechanism set screw 78 of the pivoting mechanism assembly 50 are extended by means of the slot with a screw driver. The pivoting mechanism set screw 76 and the pivoting mechanism set screw 78 are thus extended into the grout line 90 through the bullet shaped body member inner wall opening 34. The pivoting mechanism set screw 78 may be set to a slightly lower depth than the pivoting mechanism set screw 76 are to ensure that each set screw contacts the grout line 90 to the same depth. That is, as the pivoting mechanism set screw 78 travels in a greater arc than the pivoting mechanism set screw 76 the point of the pivoting mechanism set screw 78 must not extend as far through the pivoting mechanism floor 62.

A geothermal fluid assembly 100 terminates at one end with a geothermal fluid line nose piece 102. A geothermal fluid input line 104 is in fluid communication through the geothermal fluid line nose piece 102 with a geothermal fluid return line 108. A geothermal fluid line nose piece opening 110 is located in the geothermal fluid line nose piece 102.

The geothermal fluid assembly 100 is connected with the bullet shaped body member 10 at the fluid line retention mechanism 26 and fluid line retention mechanism 28. The geothermal fluid assembly 100 geothermal fluid line nose piece 102 may be secured by a bolt or a tie line (not shown) to the fluid line retention mechanism 26 and fluid line retention mechanism 28 through the fluid line retention mechanism 30 and the geothermal fluid line nose piece opening 110.

The geothermal fluid assembly 100 is positioned in line with a bore in the earth. With the grout line 90 and the 100 both secured to the bullet shaped body member 10 the grout line 90 and the geothermal fluid assembly 100 are played out following the bullet shaped body member 10 in the bore in the earth. When a maximum extent of the bore in the earth is reached the insertion force on the geothermal fluid assembly 100 is maintained while the grout line 90 is pulled and/or twisted to release the pivoting mechanism set screw 76 and pivoting mechanism set screw 78 from the grout line 90.

The grout line 90 may be recovered, cleaned of grout, and reused with another bullet shaped body member 10. A small amount of the grout line 90 at the end that was contacted by the pivoting mechanism set screw 76 and the pivoting mechanism set screw 78 may be removed as it me be damaged and not suitable for retention in the bullet shaped body member 10 by the 76 and the pivoting mechanism set screw 78.

In operation, the geothermal system operates in a conventional manner by introducing a geothermal fluid through geothermal fluid input line 104 to extract heat value from the earth. The geothermal fluid return line 108 then returns the heated geothermal fluid.

The grout line 90 may be recovered, cleaned of grout, and reused with another bullet shaped body member 10. A small amount of the grout line 90 at the end that was contacted by the pivoting mechanism set screw 76 and the pivoting mechanism set screw 78 may be removed as it me be damaged and not suitable for retention in the bullet shaped body member 10 by the 76 and the pivoting mechanism set screw 78.

In an alternative embodiment of the invention the 76 and pivoting mechanism set screw 78 are offset from one another as shown in FIG. 6. In the offset which may conveniently be 30 to 45 degrees as measured from the center of the grout line a channeling effect is avoided. The channeling may occur if the 76 and the pivoting mechanism set screw 78 are not offset because there would be a tendency for the 76 to channel the grout line 90 and the full effect of the pivoting mechanism set screw 78 in grasping the grout line 90 would be lost as material from the 90 is removed by the 76. In the offset method each of 76 and pivoting mechanism set screw 78 would aid one another in resisting channeling.

From the above description of the invention, those skilled in the art will perceive improvements, changes and modifications. Such improvements, changes and modifications within the skill of the art are intended to be covered by the appended claims.

What is claimed is:

1. A device for introducing a geothermal system into the earth comprising:
    a bullet shaped body member 10;
    said bullet shaped body member 10 having a bullet shaped body member inner wall 32;
    said bullet shaped body member inner wall 32 defining at least a portion of a bullet shaped body member chamber 40;
    a projecting rod 36 extending from a forward region of said bullet shaped body member 10 into said bullet shaped body member chamber 40;
    said projecting rod 36, for when in use, guiding a grout line in said chamber 40;
    a pivoting mechanism assembly 50 attached to said bullet shaped body member wall 14;
    said pivoting mechanism assembly 50 having at least one pointed region 76, and,
    said pointed region 76, for when in use, to retain the grout line within said bullet shaped body member chamber 40.

2. The device according to claim 1, wherein said pointed region is a pivoting mechanism set screw 76.

3. The device according to claim 1, wherein said pivoting mechanism assembly 50 has at least two pointed regions 76.

4. The device according to claim 1, wherein said projecting rod 36 is a cylindrically shaped.

5. The device according to claim 1, wherein said pivoting mechanism assembly 50 has at least two pointed regions, and said two pointed regions are each linearly aligned parallel to the axis of said cylindrically shaped projection.

6. The device according to claim 1, wherein said pivoting mechanism assembly 50 has at least two pointed regions, and said two pointed regions are each linearly aligned separately to the axis of said cylindrically shaped projection.

7. The device according to claim 1, wherein said moveable workpiece has at least two pointed regions, and said two pointed regions are each non-linearly aligned parallel to the axis of said cylindrically shaped projection.

8. The device according to claim 1, wherein a cover plate 22 is located over an opening in said bullet shaped body member wall 14 and said cover plate 22 is adjustable to permit adjustment of said pointed region 76.

9. The device according to claim 1, wherein said bullet shaped body member 10 has at least one fluid line retention mechanism 26 extending from a rearward position, for when in use, to permit attachment of a geothermal fluid assembly 100.

10. The device according to claim 3, wherein said pivoting mechanism assembly 50 has a pivoting mechanism floor 62 and said at least two pointed regions 76 extend through said pivoting mechanism floor 62 to a different extent.

11. A method for installing a geothermal system in the earth comprising:
  making one or more bores into the earth;
  introducing into at least said one bore in the earth at least one bullet shaped body member 10;
  at least one fluid line retention mechanism 26 extending from a rearward position of said bullet shaped body member 10;
  a geothermal fluid assembly 100 permanently affixed to said fluid line retention mechanism 26;
  said bullet shaped body member 10 having a bullet shaped body member inner wall 32;
  a bullet shaped body member chamber 40 at least partially defined by said bullet shaped body member inner wall 32;
  a projecting rod 36 extending from a forward region of said bullet shaped body member 10 into said bullet shaped body member chamber 40;
  said projecting rod 36 aligning a grout line 90 in said chamber 40;
  a pivoting mechanism assembly 50 attached to said bullet shaped body member wall 14;
  said pivoting mechanism assembly 50 having at least one pointed region 76;
  said pointed region 76 maintaining a grout line 90 within said bullet shaped body member chamber 40 while said grout line 90 is positioned to an desired extent in the bore in the earth;
  said grout line 90 being detached from said bullet shaped body member 10; and,
  introducing grout to the bore in the earth said through grout line 90 at a time while said grout line 90 is being withdrawn from the bore in the earth.

* * * * *